US008443835B2

(12) United States Patent
Gransee et al.

(10) Patent No.: US 8,443,835 B2
(45) Date of Patent: May 21, 2013

(54) MICROFLUIDIC STRUCTURE AND METHOD OF MEASUREMENT AND/OR POSITIONING OF A VOLUME OF A LIQUID

(75) Inventors: Rainer Gransee, Mainz (DE); Tina Röser, Brohl (DE)

(73) Assignee: Institut fur Mikrotecknik Mainz GmbH, Mainz (DE)

( * ) Notice: Subject to any disclaimer, the term of this patent is extended or adjusted under 35 U.S.C. 154(b) by 323 days.

(21) Appl. No.: 12/924,844

(22) Filed: Oct. 6, 2010

(65) Prior Publication Data

US 2011/0079094 A1 Apr. 7, 2011

(30) Foreign Application Priority Data

Oct. 6, 2009 (DE) ........................ 10 2009 045 404

(51) Int. Cl.
*F03B 11/02* (2006.01)
*G01N 11/00* (2006.01)

(52) U.S. Cl.
USPC ..................................... 137/561 R; 73/53.01

(58) Field of Classification Search
USPC ..................................... 73/53.01; 137/561 R
See application file for complete search history.

(56) References Cited

U.S. PATENT DOCUMENTS 7,244,961 B2 * 7/2007 Jovanovich et al. ............ 257/48
2002/0182113 A1 * 12/2002 Shvets et al. ..................... 422/99
2004/0238052 A1 * 12/2004 Karp et al. .................... 137/822
2005/0056321 A1 3/2005 Rehm et al.
2005/0266582 A1 12/2005 Modlin et al.
2007/0068573 A1 * 3/2007 Cox et al. .......................... 137/1

FOREIGN PATENT DOCUMENTS

DE 102 28 767 A1 2/2003

* cited by examiner

*Primary Examiner* — Hezron E Williams
*Assistant Examiner* — David Z Huang
(74) *Attorney, Agent, or Firm* — Hudak, Shunk & Farine Co. LPA

(57) ABSTRACT

A measurement channel for use in a microfluidic system, particularly a lab-on-chip system, having a first end at which a first gas permeable but liquid impermeable wall section is disposed which makes available a gas conduit, and a second end at which the measurement channel is connectable to at least one fluid conduit and at which an isolation or cutoff device is disposed, wherewith in the measurement channel a defined volume is included between the wall section and the isolation or cutoff device. A microfluidic structure is disclosed having a plurality of fluid conduits, and further having a valve for selectively connecting and/or blocking the fluid conduits, at least one of which fluid conduits is in the form of a measurement channel. A method of measuring and/or positioning a volume of a liquid in a microfluidic system, by a measurement channel is disclosed.

21 Claims, 6 Drawing Sheets

MICROFLUIDIC STRUCTURE AND METHOD OF MEASUREMENT AND/OR POSITIONING OF A VOLUME OF A LIQUID

FIELD OF THE INVENTION

The invention relates to a measurement channel for use in a microfluidic system, and a microfluidic structure in a substrate, particularly in a lab-on-chip system, having a plurality of fluid conduits including a measurement channel, and having a valve connected to the fluid conduits for selectively connecting and/or blocking said fluid conduits. The invention also relates to a method of measuring and/or positioning a volume of a liquid in a microfluidic system, particularly in a lab-on-chip system.

BACKGROUND OF THE INVENTION

It is known to measure, position, and distribute liquids in a microfluidic chip with the aid of so-called “dimensioning slides” in combination with one or more rotary valves and fluidic photocell detection systems. Because in practice not more than two such dimensioning slides can be interconnected via a valve, a plurality of separate valve means are required to dimension and position more than two liquids. This increases the space requirements and the number of valve components, as well as the number of optical components for the photocell systems. The cost of the overall system increases accordingly. Moreover, because of the combination of dimensioning slides and rotary valves, the “dead volume” increases, which means increased losses of liquids.

SUMMARY OF THE INVENTION

The underlying problem of the present invention was to reduce the above-described disadvantages, and to devise an economical and efficient method of measuring and/or positioning a volume of a liquid in a microfluidic system, and further to devise an economical microfluidic structure for this purpose.

This problem is solved according to the invention by a measuring channel for use in a microfluidic system, particularly a lab-on-chip system, having a first end at which a first gas permeable but liquid impermeable wall section is disposed which makes available a gas conduit, and a second end at which the measurement channel is connectable to at least one fluid conduit and at which an isolation or cutoff means is disposed, wherewith in the measurement channel a defined volume is included between the wall section and the isolation or cutoff means, a microfluidic structure particularly in a lab-on-chip system, having a plurality of fluid conduits for receiving and/or guiding a fluid stream, and further having a valve connected with the fluid conduits, for selectively connecting and/or blocking the fluid conduits; characterized in that at least one fluid conduit in the form of a measurement channel, which channel on the side of its second end is connected to at least one other fluid conduit via the valve and is closed or closable on the side of its first end and a method of measuring and/or positioning a volume of a liquid in a microfluidic system, particularly in a lab-on-chip system, having a measurement channel which is closed or closable on the side of its first end and is connectable to at least one fluid conduit via a valve, on the side of its second end, which measurement channel has on its first end a first gas permeable but liquid impermeable wall section which has means for a gas conduit, and which measurement channel has on its second end a means of isolation or cutoff, wherewith a defined volume is included between the wall section and the isolation or cutoff means; said method comprising the following steps: a) Connecting the measurement channel to a supply conduit, via the valve; b) Filling the measurement channel up to the first wall section with a liquid, from the supply conduit, wherewith a pressure difference is established between the supply conduit and the gas conduit; c) Separating the liquid volume enclosed in the measurement channel between the wall section and the isolation or cutoff means, from a residual or excess amount of liquid disposed ahead of the isolation or cutoff means on the side of the second end of said measurement channel, or a method wherein the isolation or cutoff means is in the form of a second gas permeable but liquid impermeable wall section which has means for a gas conduit, wherewith step c) is comprised of the following: c') Connecting the measurement channel to a first withdrawal conduit via the valve; c'') Withdrawing the excess liquid disposed between the valve and the second wall section, through the first withdrawal conduit, by establishing a pressure difference between the gas conduit of the second wall section and the first withdrawal conduit. Advantageous refinements are set forth in the dependent claims.

The inventive measurement channel for use in a microfluidic system, particularly a lab-on-chip system, has a first end which adjoins a first gas permeable but liquid impermeable wall section which makes available a gas conduit, and has a second end at which the measurement channel is connectable to at least one fluid conduit, at which second end an isolation or cutoff means is present, wherewith a defined volume is included in the measurement channel between the wall section and the isolation or cutoff means.

The measurement channel, which e.g. may comprise a groove in a microfluidic chip and which may be closed off with a cover film, is bounded by one more walls which define the channel cross section. The term “wall section” as used herein describes a delimited contiguous region of one or more of these walls. The channel is further bounded by its two ends, which are not necessarily perpendicular walls but merely comprise positions which define the length and volume of the measurement channel. The “first end” is the position of the first wall section along the measurement channel, and the “second end” is the isolation or cutoff means.

The measurement is carried out in the measurement channel without active optical monitoring, solely by filling the measurement channel with a liquid up to the first wall section, and separating the liquid volume included in the measurement channel between the wall section and the isolation or cutoff means from an excess residual amount of liquid which is disposed on the side of the second end of the measurement channel upstream of the isolation or cutoff means.

The measurement channel is preferably closed or closable at a first end. Accordingly, it will be described as a “dead end channel”. This configuration has an advantage, in combination with the fact that the first gas permeable but liquid impermeable wall section is disposed at a closed or closable end of the measurement channel, that the “dead space” is relatively small and one can very precisely position the measured liquid plug.

The isolation or cutoff means is advantageously in the form of a second gas permeable but liquid impermeable wall section which makes available a gas conduit. The separation and measurement of the liquid plug occurs in the measurement channel (without active optical monitoring) solely by establishing a pressure difference between a filling opening which opens out into the measurement channel and the gas conduit, via the first gas permeable but liquid impermeable wall section. Because in most microfluidic systems a pressure control means is needed for moving and positioning the so-called liquid plug, the invention in comparison to measurement devices according to the state of the art is therefore less costly in apparatus cost.

Alternatively, advantageously the isolation or cutoff means is in the form of a valve. Preferably the valve serves both as an isolation or cutoff means for measurement of the liquid volume and a control valve for selectively connecting the measurement channel to or shutting it off from a desired fluid conduit (e.g. a feed conduit or withdrawal conduit). In this configuration as well, the measurement channel comes without additional fluid control components. Valve control means of various types are basically known in microfluidics. Reference is made, e.g., to U.S. 2005/0056321 A1 and DE 10228767 A1 .

One or both of the gas permeable but liquid impermeable wall sections is/are preferably in the form of a membrane and/or has/have a capillary structure extending through the channel wall which structure presents a high resistance to penetration by a liquid. In both cases it is critical that the liquid cannot penetrate the wall section or at least not unless a very high limiting pressure difference $\Delta P_G$ is applied (representing the difference between the interior pressure $P_i$ in the measurement channel and the exterior pressure $P_a$ in the gas conduit), which pressure difference is very high in comparison to the pressure difference $\Delta P_N$ normally employed in filling, emptying, and generally transporting liquids.

If a membrane is used for the gas permeable but liquid impermeable wall section, preferably this membrane is comprised of a non-wettable material, preferably a polymer membrane material, particularly preferably polytetrafluroethylene. Such gas permeable but liquid impermeable membranes are known to be used in a microfluidic system from, e.g., U.S. 2005/0266582 A1.

According to a preferred embodiment of the invention, the gas conduit comprises a ventilation opening to the environment which is downstream of the gas permeable but liquid impermeable wall section. This configuration is simple, because it requires no pump means on the side of the gas conduit. The transport of liquids in the measurement channel occurs from the liquid inlet or liquid withdrawal side, wherewith with this configuration the filling occurs under an overpressure at the feed conduit and the withdrawal occurs under an underpressure at the withdrawal conduit.

The inventive microfluidic structure in a substrate, particularly in a lab-on-chip system, has a plurality of fluid conduits for receiving and/or guiding a fluid stream, and further has a valve connected with the fluid conduits, for selectively connecting and/or blocking the fluid conduits. One of the fluid conduits is in the form of a measurement channel of the type described supra, which channel on the side of its second end is connected to at least one other fluid conduit via the valve and is closed or closable on the side of its first end. The phrase “on the side of the first end” or “on the side of the second end” indicates that the closure means or valve forms the given end of the measurement channel, thus is functionally a part of the measurement channel, and that it is disposed outside and at a distance from the ends of the fluid channel. In particular, a closure means which forms the first end, which coincides with the first wall section, allows filling and emptying with minimal loss of liquid due to dead spaces.

With the use of a valve device, the filling, measuring, and emptying can be carried out in a simple manner. In particular, the valve for selectively connecting and/or blocking the fluid conduits constitutes or may constitute the isolation or cutoff means. Also, a valve may be employed to connect a plurality of measurement channels, particularly more than two such channels.

The gas conduit and/or the at least one other fluid conduit is preferably connectable to a pump means which is set up to produce a pressure difference between the gas conduit and said at least one other fluid conduit, for supplying a fluid to the measurement channel and/or for withdrawing a fluid from said measurement channel. The chip with the inventive microfluidic structure can be incorporated in a so-called “operating device”, for purposes of forming the connection to the pump means, which “operating device” provides a fluidic connection to the microfluidic chip via interfaces.

It is further advantageous if a pressure measurement device is provided which communicates with a fluid line in the microfluidic structure, wherewith the signal from the pressure measurement device can be advantageously employed for control of the pump means according to one of the methods described hereinbelow.

Advantageously, two or more of the above-described measurement channels may be disposed in succession, wherewith the second end of a first measurement channel forms the first end of a second measurement channel.

The inventive method for measuring and/or positioning a volume of a liquid in a microfluidic system of the type described comprises the following steps, according to one embodiment or aspect of the invention:

a) Connecting the measurement channel to a supply conduit, via the valve;

b) Filling the measurement channel up to the first wall section with a liquid, from the supply conduit, wherewith a pressure difference is established between the supply conduit and the gas conduit;

c) Separating the liquid volume enclosed in the measurement channel between the wall section and the isolation or cutoff means, from a residual or excess amount of liquid disposed ahead of the isolation or cutoff means on the side of the second end of said measurement channel.

The same fluid conduit may be used for feed and withdrawal purposes, but it should be understood that feed and withdrawal are functionally quite different operations.

After the filling, in step b), depending on the available amount of liquid the measurement channel will be either entirely filled or partially filled. If the fill liquid extends beyond the isolation or cutoff means thus if there is excess liquid, the separation step c) will ensure that only the precisely defined volume of liquid disposed between the first wall segment and the isolation or cutoff means will remain for further use.

If the isolation or cutoff means is in the form of a second gas permeable but liquid impermeable wall section, which makes available a gas conduit, preferably the step c) comprises the following:

c') Connecting the measurement channel to a first withdrawal conduit via the valve;

c") Withdrawing the excess liquid disposed between the valve and the second wall section, through the first withdrawal conduit, by establishing a pressure difference between the gas conduit of the second wall section and the first withdrawal conduit.

If, as assumed above, after the filling of the measurement channel in step b) wherewith liquid extends beyond the second wall section, the wall section closer to the valve, the removal in step c") ensures that only the precisely defined volume of liquid disposed between the wall segments in the measurement channel will remain for further use.

If the isolation or cutoff means is in the form of a valve for selectively connecting and/or blocking the fluid conduits, step c) preferably comprises the following:

c''') Separation of the measurement channel from the supply conduit by closing the valve.

According to another embodiment or a second aspect of the invention, in a microfluidic system having a measurement channel which is closed or closable on the side of its first end and is connectable to at least one fluid conduit via a valve, on the side of its second end, which measurement channel has on its first end a first gas permeable but liquid impermeable wall section and has on its second end a second gas permeable but liquid impermeable wall section, each of which wall sections having means for a gas conduit, wherewith a defined volume is included between the wall sections in the measurement channel, the method comprises the following step:

d) Filling the measurement channel with a liquid via a filling opening which opens out into the measurement channel between the wall sections, by establishing a pressure difference between the filling opening and the two gas conduits, then closing the filling opening.

This variant represents the relatively simple case of a transverse filling, thus one which occurs in the direction of the channel. This case is particularly simple in that the measurement or measuring out occurs in a single step. It is assumed that the liquid is introduced via the inlet opening via suction, by the presence of a pressure at the gas conduits which is lower than the pressure prevailing in the rest of the system. Then the valve connects the measurement channel with an outlet conduit, to remove the now measured out liquid.

Preferably, in a microfluidic system having at least two successively disposed measurement channels, wherewith the second end of a first measurement channel forms the first end of a second measurement channel, after step c) according to the first embodiment of the inventive method or after step d) according to the second embodiment of the inventive method the steps a) to c) are repeated or the step d) is repeated. The first filling of the measurement channel according to step b) is carried out up to the second wall section which is the closest wall section to the valve; this is the starting point for the second filling, wherein the said second wall section now represents a first wall section. Accordingly, the first removal of the excess liquid according to step d) occurs from the initially second wall section, and the second removal occurs from an isolation or cutoff means now closer to the valve. The terms "initially second" and the term "closer" relate to the closer wall section and closer isolation or cutoff means which are closer to the valve in the first filling and the first withdrawal; and the term "now closer" relates to the closer wall section and closer isolation or cutoff means which are closer to the valve in the second filling and the second withdrawal. When one has a two-step filling of such a measurement channel having at least three gas permeable but liquid impermeable wall sections, two liquids are measured out in succession in a single measurement channel, wherewith by appropriate application of pressure or underpressure to the desired gas conduits the liquid volumes can be selectively withdrawn from the measurement channel either sequentially or together. In the latter case, the liquid volumes can then be introduced into, e.g., a mixing segment, in order to achieve mixing of the initial substances in a precise ratio.

It is advantageous if the following steps are carried out after step c) or d):

e) Connection of the measurement channel to a second withdrawal conduit via the valve;

f) Removal of the liquid included between the wall section closer to the valve and the wall section farther from the valve, through the second withdrawal conduit, by establishing a pressure difference between the gas conduit associated with the wall section farther from the valve and the said second withdrawal conduit.

Here again, the terms "feed conduit", "first withdrawal conduit", and "second withdrawal conduit" should be understood in the functional sense; they may in fact refer to the same physical conduit.

Preferably, the filling occurs by continuous pumping of the liquid into the measurement channel by means of a pump device. For a pump operating at a given pressure, continuous pumping represents one of two alternative transport principles.

Under continuous pumping, preferably the system pressure is measured by a pressure measurement device which communicates with the feed conduit or the measurement channel.

This pressure measurement is advantageously exploited by shutting off the pump device when a significant pressure increase is determined in the feed conduit or the measurement channel. Such a pressure increase is expected to always occur when during filling the liquid reaches a wall section at which the external pressure in the associated gas conduit, $P_a$, is lower than the internal pressure $P_i$ in the rest of the system, in the normal case (normal system pressure).

In particular, it is advantageous if the pressure at which the pump device is shut off is higher than the normal system pressure $P_i$ and lower than the limiting pressure difference $\Delta P_G$ between an elevated internal pressure $P'_i$ in the measurement channel and the external pressure $P_a$ in the gas conduit at which limiting pressure difference the liquid begins to penetrate the gas permeable but liquid impermeable wall section.

BRIEF DESCRIPTION OF THE DRAWINGS

Additional problems addressed, features, and advantages of the invention will be described in more detail hereinbelow, with the use of exemplary embodiments and with reference to the accompanying drawings.

DETAILED DESCRIPTION OF THE INVENTION

Figure 1:
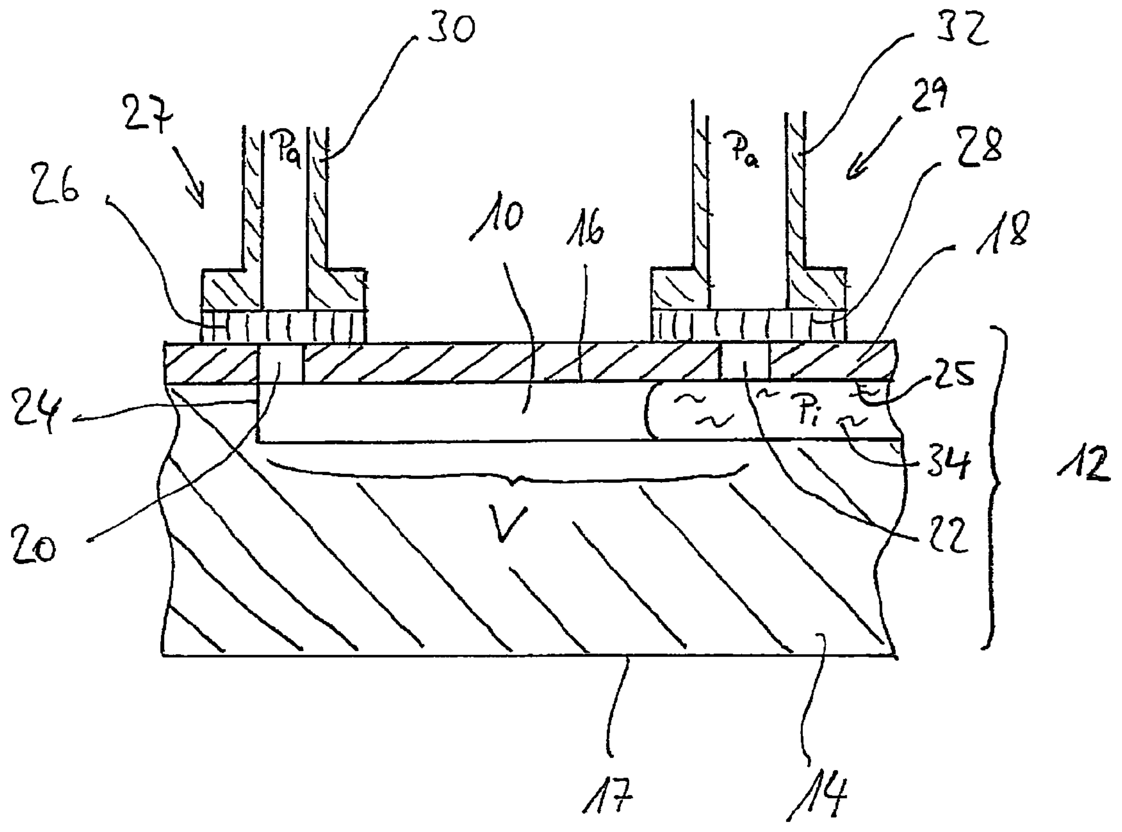
FIG. 1 is a cross sectional view of the principal structure of the inventive measurement channel.

In FIG. 1 the inventive measurement channel 10 is shown in a cross sectional view through a microfluidic chip 12. The microfluidic chip 12, typically, has a substrate 14 into which the measurement channel 10 and possible other fluid conduits and/or other functional structures are fabricated, from its upper side 16 and/or from a lower side 17 (not shown). As a rule, substrates with the fluid conduits are fabricated in an injection molding process. Alternatively, the conduits may be machined into the surface of the substrate 14 or impressed into the surface in the course of the injection molding process. The measurement channel 10 and the other fluid conduits not shown here are closed off against the environment by means of a cover film 18 on the upper side 16 (or lower side).

In the present case, the cover film 18 has two openings 20, 22, one of which 20 opens into the measurement channel 10 at an end surface 24 of said measurement channel 10. As a result of the end surface 24 which bounds the measurement channel 10 on one side, the measurement channel 10 is a "dead channel" for a liquid but not for a gas, which gas can flow out of the channel 10 through the openings 20 and 22, as will be described infra. For a liquid, the measurement channel thus has only one access opening 25, which said channel is connectable or connected to adjoining fluid conduits via said opening 25. At the same time, as a result of the end surface 24 which connects flushly to the opening 20, the channel 10 can be filled with liquid completely without voids or dead space.

A first wall section which is impermeable to liquids but permeable to gases is disposed above the opening 20; and a second wall section which is impermeable to liquids but permeable to gases is disposed above the opening 22. These first and second wall sections are each in the form of a membrane 26; 28. These membranes, being gas permeable, provide for passage of gas through adjoining channels 27, 29 from and to the measurement channel 10. In particular, respective gas conduits 30; 32 are disposed on the outer sides of the membranes 26 and 28, by means of flange joints or from the operator device. The configurations of the membranes and the gas conduits are shown in simplified schematic form. Preferably, the membranes are seated in a membrane seat formed in the substrate, e.g. with the aid of a pressure ring. Preferably the pressure ring is irreversibly fixed to the substrate, by welding, e.g. ultrasound welding, and forms a flush surface with the substrate, providing a surface capable of forming a gas-tight connection to a gas conduit.

Between the wall sections 26 and 28, the measurement channel 10 encloses a defined volume V.

In the following, the functioning of the measurement channel will be described with the aid of an exemplary embodiment as illustrated in FIG. 1. To fill the measurement channel 10 with a liquid through the access opening 25, first a pressure difference $\Delta P_N$ is applied between the supply pressure $P_i$ in the interior of the measurement channel 10 and the exterior pressure $P_a$ in the opening 20 of the gas conduit 27 distant from the access opening 25. The relative pressure $\Delta P_N$ between the inlet side and the gas outlet side moves the plug 34 of liquid present in the fluid conduit up to the opening 20 ahead of the membrane 26. As soon as the liquid plug 34 reaches the membrane 26 distant from the opening 25, the pressure in the interior of the measurement channel 10 increases, assuming a constant volume. This pressure increase can be detected by a suitable pressure measurement device (not shown) connected with a fluid conduit which communicates with the measurement channel 10. The corresponding signal is then sent to a pump control means, which turns off the pump, in order to avoid increasing the interior pressure $P'_i$ to the point that the pressure difference between $P'_i$ and $P_a$ exceeds the limiting pressure difference $\Delta P_G$ at which the liquid is forced out through the membrane.

Assuming that the advanced plug of liquid 34 is of greater volume than the volume V defined by the measurement channel 10, the column of liquid will rise into the second opening 22 ahead of the measurement channel 10. The measurement now takes place in a second step, wherein a higher external pressure $P_a$, which is higher than the interior pressure $P_i$, is applied to the second gas conduit 29 which is closer to the access opening 25. The resulting pressure difference causes the liquid ahead of the opening 22 in the direction of the access opening 25 to be forced out or aspirated out of the channel in the reverse direction, so that the only liquid which remains between the openings 20 and 22 is the volume V of liquid defined by the length of the measurement channel 10. Thus the second wall section acts as a cutoff means. The accurately determined volume of liquid can then be drawn off from the measurement channel 10 for further use, by applying a higher exterior pressure $P_a$ higher than the interior pressure $P_i$ to the gas conduit 27 which is farther from the opening 25.

Figure 2:
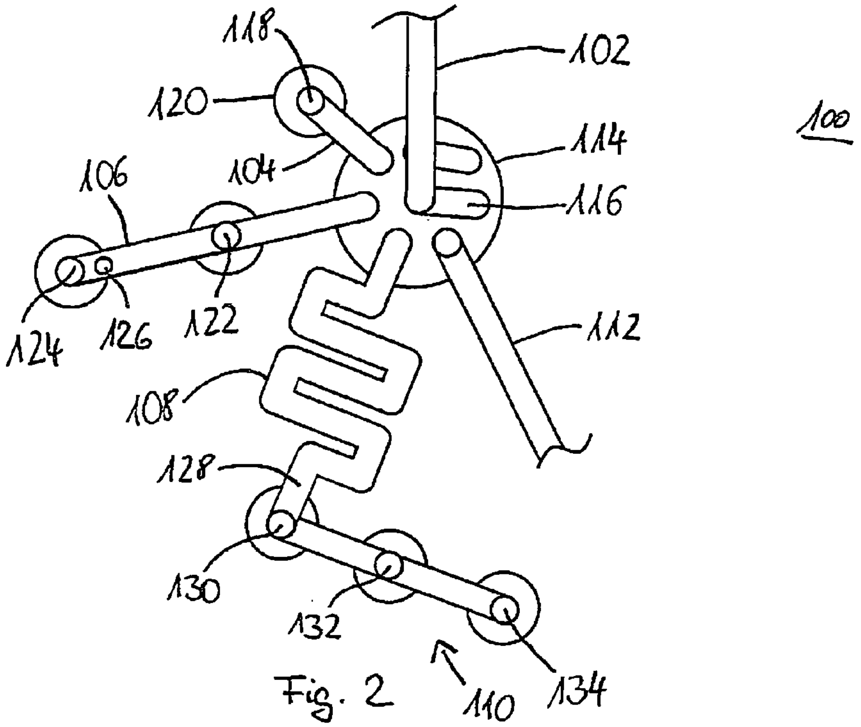
FIG. 2 illustrates a microfluidic structure in a lab-on-chip system with a plurality of inventive measurement channels.
Figure 3:
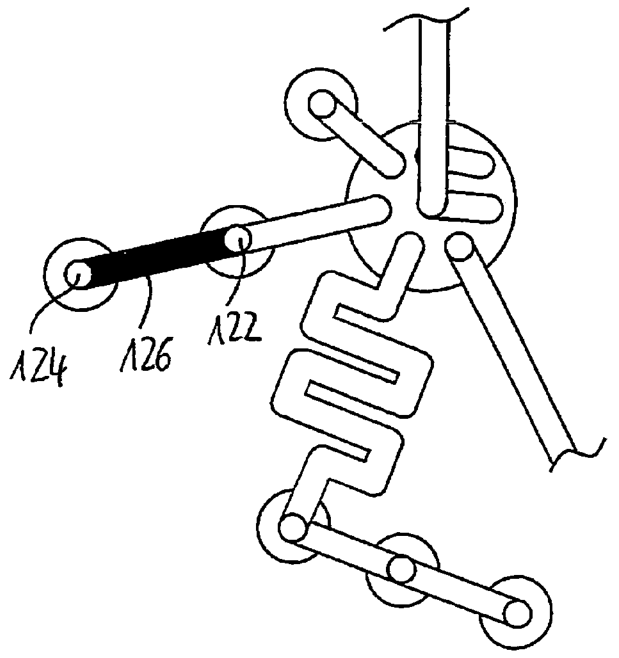
FIG. 3 illustrates the microfluidic structure according to FIG. 2, after a first step in a sequence of fluidic controls.
Figure 4:
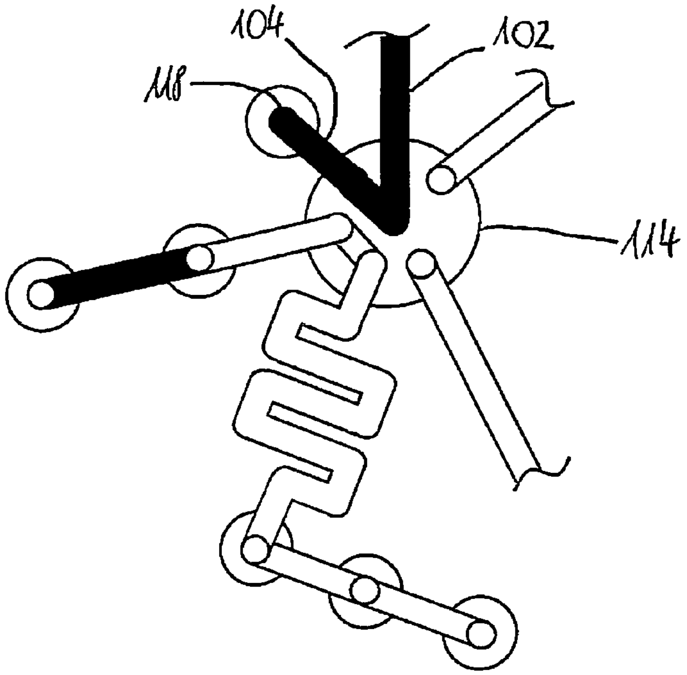
FIG. 4 illustrates the microfluidic structure according to FIG. 2, after a second step in a sequence of fluidic controls.
Figure 5:
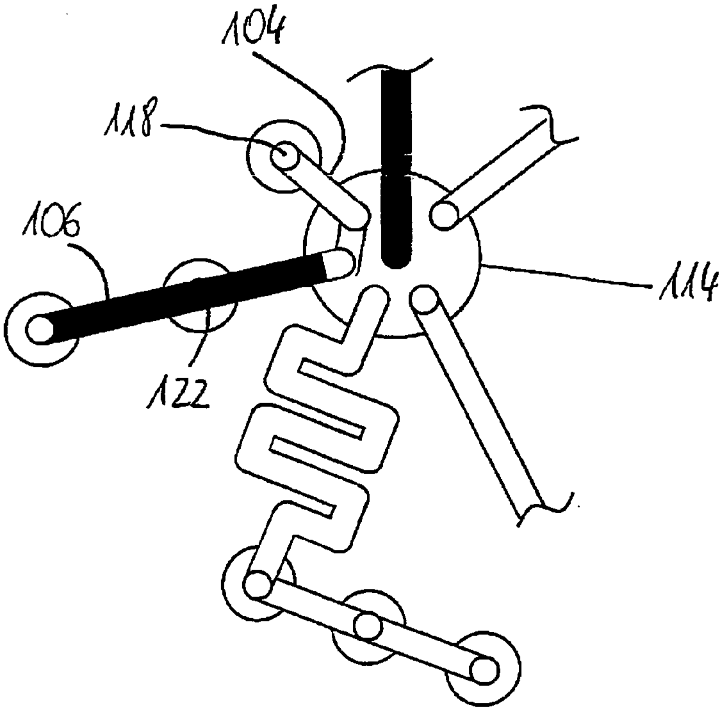
FIG. 5 illustrates the microfluidic structure according to FIG. 2, after a third step in a sequence of fluidic controls.
Figure 6:
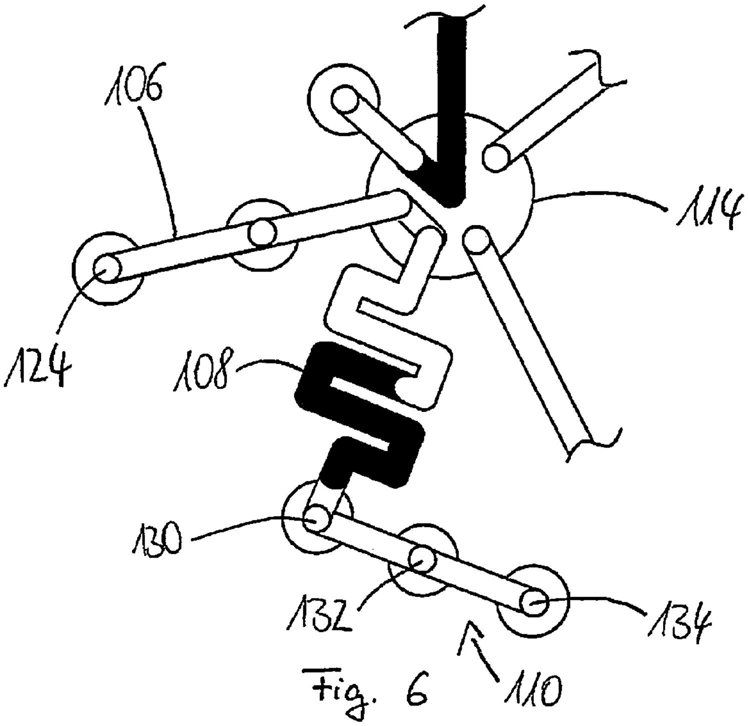
FIG. 6 illustrates the microfluidic structure according to FIG. 2, after a fourth step in a sequence of fluidic controls.

FIG. 2 illustrates schematically, in a plan view, an exemplary microfluidic structure with a plurality of fluid conduits which is formed on a microfluidic chip 100. The various fluid conduits are: a feed conduit 102, a first measurement channel 104, a supply channel or a second separate measurement channel 106, a zigzag mixing segment 108, a third measurement channel 110 which is comprised of two successive adjoining measurement channels, and a withdrawal channel 112. Further a rotary valve 114 is provided on the microfluidic chip 100, for interconnecting or mutually separating the fluid conduits. E.g., the feed conduit 102 opens out into the center of the rotary valve 114 and can be selectively connected with fluid conduit 104, 106, 108, or 112, via a first valve channel 116.

The first measurement channel 104 has a first wall section 118 on its end distal from the rotary valve 114, which wall section is gas permeable but liquid impermeable. This wall section 118 is formed by a membrane which is disposed in a membrane seat 120.

The connecting channel or combining channel 106 has two gas permeable but liquid impermeable wall sections 122, 124 which are disposed in sequence, the first of which wall sections 124 is disposed at the end of the channel which is distal from the rotary valve 114, and the second of which sections 122 is closer to the rotary valve 114, namely at approximately the midpoint of the combining channel 106. A transverse filling opening 126 opens out into the combining channel or second measurement channel 106 at a location between the two wall sections 122, 124.

The mixing channel 108 has a generally zigzag configuration, wherewith if two fluids are introduced to it in sequence they will become mixed together by the time they reach the outlet 128, as a result of the long extent of the channel and the multiple changes of direction in it.

The third measurement channel 110 adjoins the outlet 128; this channel has three gas permeable but liquid impermeable wall sections 130, 132, 134. Wall section 130 is the closest to the valve 114, and wall section 134 is the farthest from the valve 114.

An example of a sequence of fluid control via the microfluidic structure according to FIG. 2 will now be described, with reference to FIGS. 3 to 10.

In a first step (FIG. 3), the second measurement channel 106 between the first and second wall sections, the distant section 124 and the closer section 122, is filled with a liquid A (represented by a black bar) through the filling opening 126 (e.g. by an injection means or by application of a pressure drop to the filling opening), wherewith a pressure difference is established between the liquid flowing in through the filling opening and the respective gas conduits over the wall sections 124 and 122. Under this pressure difference, the filling of the connecting channel 106 stops as soon as the liquid covers both of the wall sections 122, 124. Then the filling opening 126 can be shut off, e.g. by means of an adhesive film or a stopper.

In a second step (FIG. 4), the rotary valve 114 is set such that the feed conduit 102 is connected with the first measurement channel 104, and said channel 104 is filled with a liquid B (also represented by a black bar) by the application of a pressure difference between the feed conduit 102 and the first wall section 118 of the first measurement channel. E.g., the gas conduit above the first wall section 118 may be connected to ambient pressure, and the feed conduit 102 may have an overpressure applied to it. When the liquid B reaches the wall section 118, a pressure increase will or can be registered with a pressure measuring means which is, e.g., in fluid communication with the feed conduit 102. A corresponding signal can then be sent to the pressure source, e.g. a pump or valve, to cause the pressure source to shut off or otherwise cease the fluid supply.

In a third step of the sequence (FIG. 5), the rotary valve 114 is set such that the first measurement channel 104 is connected to the input of the second measurement channel 106. Simultaneously the feed conduit 102 of the first measurement channel 104 is disconnected. The valve 114 thus also acts as an isolation or cutoff means in the sense of the invention. A pressure difference between the wall section 118 of the first measurement channel 104 and the wall section 122 of the second measurement channel 106 forces the measured amount of liquid B which had been in the measurement channel 104 up to the wall section 122 in the second measurement channel 106.

Figure 7:
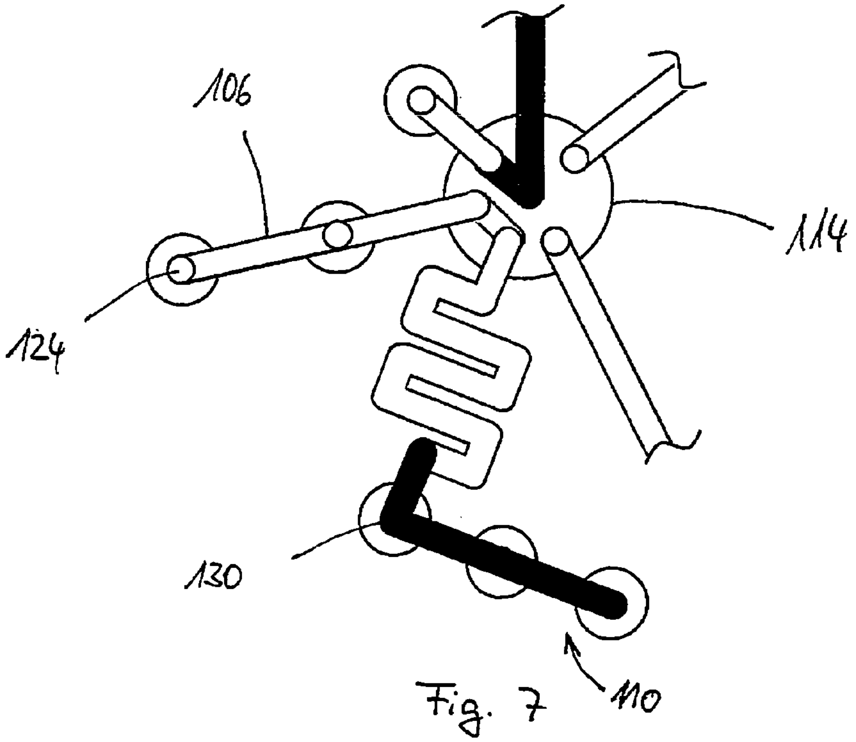
FIG. 7 illustrates the microfluidic structure according to FIG. 2, after a fifth step in a sequence of fluidic controls.
Figure 8:
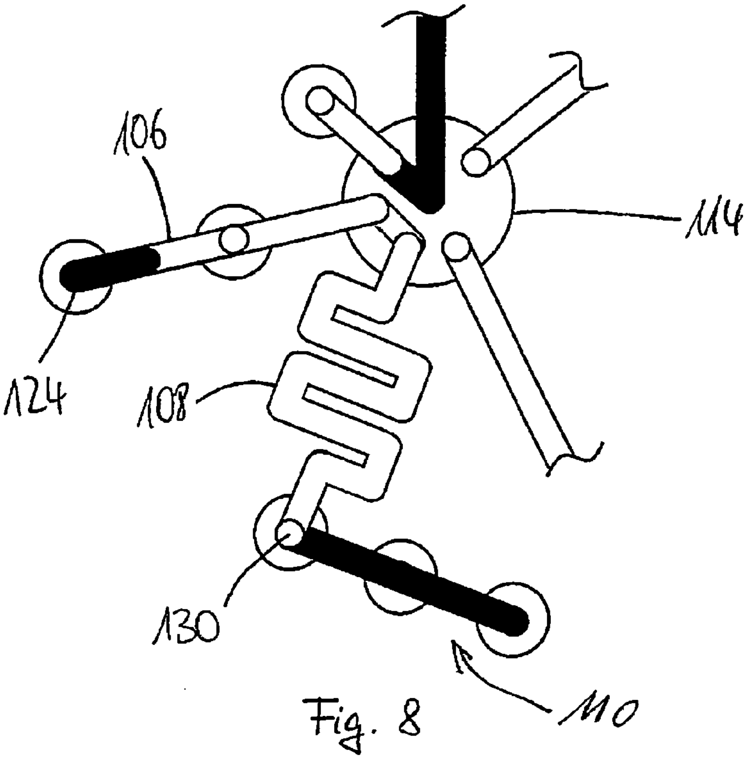
FIG. 8 illustrates the microfluidic structure according to FIG. 2, after a sixth step in a sequence of fluidic controls.
Figure 9:
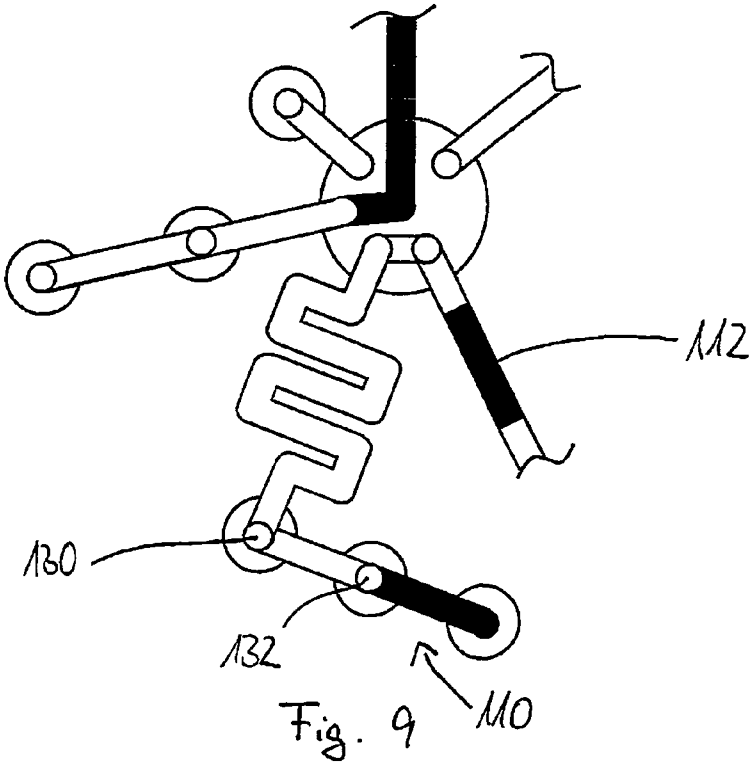
FIG. 9 illustrates the microfluidic structure according to FIG. 2, after a seventh step in a sequence of fluidic controls.
Figure 10:
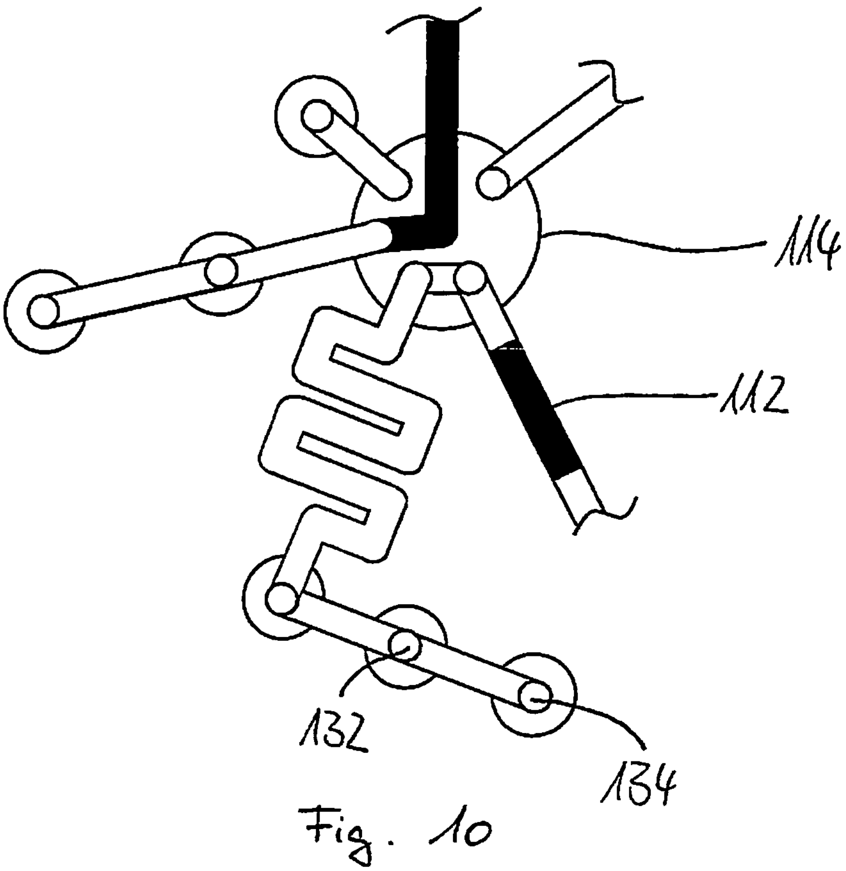
FIG. 10 illustrates the microfluidic structure according to FIG. 2, after an eighth step in a sequence of fluidic controls.

In a fourth step (FIG. 6), the rotary valve 114 is rotated further by one step, wherewith the second measurement channel 106 is connected to the zigzag mixing channel 108. A pressure difference between the wall section 124 of the second measurement channel 106 which section is distal from the rotary valve 114 and at least the wall section 134 of the third measurement channel 110 which section is distal from the valve 114 causes the two liquids A, B to be forced in sequence into and through the zigzag mixing channel 108; the liquids then become intermixed and are advanced in the third measurement channel up to the wall section 134 which is farthest from the mixing channel (FIG. 7).

The mixed liquid AB is then measured out, wherewith the excess amount of liquid disposed upstream of the wall section 130 which is closest to the valve 114 is drawn off by application of a pressure difference between the gas conduit above the second wall section 130 and the gas conduit above the wall section 124 of the second measurement channel which section is distal from the valve 114. The second measurement channel 106 now serves to hold the waste liquid.

In a next step (FIG. 9), the precisely measured amount of liquid AB disposed between the second wall section 130, closest to the valve 114, and the first (middle) wall section 132 next farther from the valve 114, is transported toward the withdrawal conduit 112, for further use inside or outside the microfluidic chip; this is done by establishing a pressure difference between the gas conduit over the wall section 132 and the interior pressure of the conduit 112.

Finally, using essentially the same path, the precisely measured amount of liquid between the middle (now second) wall section 132 and the distal from the valve 114 wall section (now the first wall section) 134 is transported into the withdrawal conduit 112; this is done by establishing a pressure difference between the gas conduit over the distal wall section 134 and the interior pressure of the conduit 112.

It is to be understood that the sequence illustrated in FIGS. 2 to 10 and the illustrated configuration of the microfluidic structure represent only one example among innumerable application possibilities of the inventive measurement principle. For example, the pressure difference needed for the transport can be supplied by underpressures and overpressures. It should be apparent from the present disclosure that there is no limitation to the given configuration described, but rather the scope of the invention extends to the fundamental limits of the method, the measurement channel, and the microfluidic structure as described, and as set forth in the claims.

List of Reference Numerals:

10 Measurement channel
12 Microfluidic chip
14 Substrate
16 Upper side
17 Lower side
18 Cover film
20 Openings
22 Openings
24 End surface
25 Access opening
26 Membrane
27 Gas conduit
28 Membrane
29 Gas conduit
30 Gas conduit
32 Gas conduit
34 Liquid plug
100 Microfluidic chip
102 Feed conduit
104 First measurement channel
106 Second measurement channel; combining channel
108 Mixing segment; mixing channel
110 Third measurement channel
112 Withdrawal conduit
114 Rotary valve
116 Valve channel
118 Wall section
120 Membrane seat
122 Wall section
124 Wall section
126 Filling opening
128 Outlet of the zigzag segment
130 Wall section
132 Wall section
134 Wall section
$P_i$ Internal pressure; normal system pressure
$P'_i$ Elevated internal pressure
$P_a$ External pressure
$\Delta P_N$ Normal pressure difference
$\Delta P_G$ Limiting pressure difference.

What is claimed is:

1. A measurement channel for use in a microfluidic system, comprising: a first end at which a first gas permeable but liquid impermeable wall section is disposed which makes available a gas conduit, and a second end at which the measurement channel is connectable to at least one fluid conduit and at which an isolation or cutoff means is disposed, wherewith in the measurement channel a defined volume is included between the wall section and the isolation or cutoff means, wherein the isolation or cutoff means is formed by a second gas permeable but liquid impermeable wall section which has gas conduit means.

2. The measurement channel according to claim 1; wherein the measurement channel is closed or closable on its first end.

3. The measurement channel according to claim 1; wherein the first and second gas permeable but liquid impermeable wall sections are each in the form of a membrane.

4. The measurement channel according to claim 3; wherein the membrane is comprised of one or more of a non-wettable material, a polymer membrane, and a polytetrafluoroethylene membrane.

5. The measurement channel according to claim 1; wherein the gas conduits are formed by a vent opening to the surroundings, which opening leads outward from the gas permeable but liquid impermeable wall sections.

6. The measurement channel according to claim 1; wherein the gas permeable but liquid impermeable wall section has a capillary structure which extends through the channel wall, which structure imposes a resistance to passage of a liquid.

7. A microfluidic structure in a substrate, having a plurality of fluid conduits for receiving and/or guiding a fluid stream, and further having a valve connected with the fluid conduits, for selectively connecting and/or blocking the fluid conduits; wherein at least one fluid conduit in the form of a measurement channel according to claim 1 is formed, which channel on the side of its second end is connected to at least one other fluid conduit via the valve and is closed or closable on the side of its first end.

8. The microfluidic structure according to claim 7; wherein the valve for selectively connecting and/or blocking the fluid conduits serves as the isolation or cutoff means.

9. The microfluidic structure according to claim 7 wherein the gas conduit and/or the at least one other fluid conduit is connected to a pump means which is set up to produce a pressure difference between the gas conduit and said at least one other fluid conduit, for supplying a fluid to the measurement channel and/or for withdrawing a fluid from said measurement channel.

10. The microfluidic structure according to claim 7; further including a pressure measuring device which communicates with a fluid conduit in the microfluidic structure.

11. The microfluidic structure according to claim 7; including at least two sequentially disposed measurement channels, wherewith the second end of a first measurement channel forms the first end of a second measurement channel.

12. A method of measuring and/or positioning a volume of a liquid in a microfluidic system, having a measurement channel which is closed or closable on the side of its first end and is connectable to at least one fluid conduit via a valve, on the side of its second end, which measurement channel has on its first end a first gas permeable but liquid impermeable wall section which has means for a gas conduit, and wherein the measurement channel has on its second end a means of isolation or cutoff, wherewith a defined volume is included between the wall section and the isolation or cutoff means, wherein the isolation or cutoff means is formed by a second gas permeable but liquid impermeable wall section which has gas conduit means; said method comprising the following steps:

a) Connecting the measurement channel to a supply conduit, via the valve;

b) Filling the measurement channel up to the first wall section with a liquid, from the supply conduit, wherewith a pressure difference is established between the supply conduit and the gas conduit; and c) Separating the liquid volume enclosed in the measurement channel between the wall section and the isolation or cutoff means, from a residual or excess amount of liquid disposed ahead of the isolation or cutoff means on the side of the second end of said measurement channel.

13. The method according to claim 12; wherewith step c) is comprised of the following:

c') Connecting the measurement channel to a first withdrawal conduit via the valve; and c") Withdrawing the excess liquid disposed between the valve and the second wall section, through the first withdrawal conduit, by establishing a pressure difference between the gas conduit of the second wall section and the first withdrawal conduit.

14. The method according to claim 12; wherein the valve for selectively connecting and/or shutting off the fluid conduits comprises the isolation or cutoff means, wherewith step c) is comprised of the following:

c"') Separating the measurement channel from the supply conduit by closing the valve.

15. The method according to claim 12, in a microfluidic system having at least two successively disposed measurement channels, wherewith the second end of a first measurement channel forms the first end of a second measurement channel; wherein after step c) the steps a) to c) are repeated.

16. The method according to claim 12; wherein the following steps are carried out after step c):

Connecting the measurement channel to a second withdrawal conduit via the valve;

Removing the liquid included between the isolation or cutoff means and the first wall section through the second withdrawal conduit, by establishing a pressure difference between the gas conduit associated with the first wall section and the said second withdrawal conduit.

17. The method according to claim 12; wherein the filling is carried out by continuous pumping of the liquid into the measurement channel by pump means.

18. The method according to claim 17; wherein the pressure in the system is monitored by pressure measurement means which communicate with a feed conduit or with the measurement channel.

19. The method according to claim 18; wherein the pump means are shut off when a significant pressure increase is determined in the feed conduit or in the measurement channel.

20. The method according to claim 19; wherein the pressure at which the pump means are shut off is higher than a normal pressure of the system and less than a limiting pressure difference between an interior pressure in the interior of the measurement channel and an exterior pressure in the gas conduit, which pressure difference defines the point at which the liquid is forced through the gas permeable but liquid impermeable wall section.

21. A method of measuring and/or positioning a volume of a liquid in a microfluidic system, having a measurement channel which is closed or closable on the side of its first end and is connectable to at least one fluid conduit via a valve, on the side of its second end, which measurement channel has on its first end a first gas permeable but liquid impermeable wall section and has on its second end a second gas permeable but liquid impermeable wall section, wherein an isolation or cutoff means is disposed at the second end, each of which wall sections having means for a gas conduit, wherewith a defined volume is included between the wall sections in the measurement channel; said method comprising the following step:

Filling the measurement channel with a liquid via a filling opening which opens out into the measurement channel between the wall sections, by establishing a pressure difference between the filling opening and the two gas conduits, then closing the filling opening.

* * * * *